United States Patent
Akkanen

(10) Patent No.: US 9,769,255 B2
(45) Date of Patent: Sep. 19, 2017

(54) CONTINUOUS SCHEDULING FOR PEER-TO-PEER STREAMING

(75) Inventor: Jyrki Akkanen, Espoo (FI)

(73) Assignee: Core Wireless Licensing S.a.r.l., Luxembourg (LU)

( * ) Notice: Subject to any disclaimer, the term of this patent is extended or adjusted under 35 U.S.C. 154(b) by 442 days.

(21) Appl. No.: 11/963,968

(22) Filed: Dec. 24, 2007

(65) Prior Publication Data

US 2009/0164615 A1  Jun. 25, 2009

(51) Int. Cl.
  *G06F 15/16* (2006.01)
  *H04L 29/08* (2006.01)

(52) U.S. Cl.
  CPC ........ *H04L 67/104* (2013.01); *H04L 67/1046* (2013.01); *H04L 67/1068* (2013.01); *H04L 67/1074* (2013.01); *H04L 67/325* (2013.01)

(58) Field of Classification Search
  USPC ......................................................... 709/231
  See application file for complete search history.

(56) References Cited

U.S. PATENT DOCUMENTS

| | | | |
|---|---|---|---|
| 6,047,309 A * | 4/2000 | Dan et al. | 709/201 |
| 6,125,368 A * | 9/2000 | Bridge et al. | |
| 7,174,385 B2 | 2/2007 | Li | |
| 2006/0174160 A1 | 8/2006 | Kim | |
| 2006/0212595 A1 | 9/2006 | Chen et al. | |
| 2006/0291446 A1* | 12/2006 | Caldwell et al. | 370/351 |
| 2007/0094405 A1* | 4/2007 | Zhang | H04N 7/17318 709/231 |
| 2007/0183342 A1 | 8/2007 | Wong et al. | |
| 2008/0112315 A1* | 5/2008 | Hu | H04N 7/17318 370/230 |

(Continued)

FOREIGN PATENT DOCUMENTS

| | | |
|---|---|---|
| WO | 2005091585 A1 | 9/2005 |
| WO | 2007012914 A1 | 2/2007 |
| WO | 2007110865 A1 | 10/2007 |

OTHER PUBLICATIONS

Xinyan Zhang et al., "CoolStreaming/DONet: A Data-driven Overlay Network for Peer-to-Peer Live Media Streaming", 2005, pp. 1-10.*

(Continued)

*Primary Examiner* — Viet Vu
(74) *Attorney, Agent, or Firm* — Core Wireless Licensing Ltd.

(57) ABSTRACT

Apparatuses and methods for distributing and/or receiving buffer content advertisements continuously to and/or from a plurality of neighboring peer apparatuses joined in a network are described. The buffer content advertisements identify the stored packets of data in a packet buffer. The continuously distributed and/or received buffer content advertisements may include incremental updates of content of the packet buffer piggybacked to every outgoing and/or incoming packet of data. The apparatus may determine packets of data advertised by a plurality of neighboring peers that the apparatus does not have in its packet buffer, and may request packets of data, of the advertised packets, from at least one of the plurality of neighboring peers. The apparatus may include a communication module to communicate buffer content advertisements continuously to the plurality of neighboring peers.

28 Claims, 7 Drawing Sheets

(56) References Cited

U.S. PATENT DOCUMENTS

| | | | | |
|---|---|---|---|---|
| 2008/0256255 | A1* | 10/2008 | Mordovskoi | H04N 21/2381 709/231 |
| 2008/0317050 | A1* | 12/2008 | Xiong | H04L 12/185 370/401 |
| 2009/0125995 | A1* | 5/2009 | Vercellone et al. | 726/6 |
| 2010/0146569 | A1* | 6/2010 | Janardhan | H04N 7/17318 725/98 |

OTHER PUBLICATIONS

Yong Cui and Jianping Wu, "Impact of Buffer Map Cheating on the Streaming Quality in DONet," p. 2.*

Poo Kuan Hoong and Hiroshi Matsuo, A Super-Peer based P2P Live Media Streaming System, Oct. 2007, p. 6-7.*

Ravi Malhotra, IP Routing, Jan. 2002, O'Reilly, p. 1.*

CISS: An efficient object clustering framework for DHT-based peer-to-peer applications, Jinwon Lee et al., Aug. 14, 2006, pp. 1072-1078.*

Y. H. Chu et al, "Early Experience with an Internet Broadcast System Based on Overlay Multicast", in USENIX Annual Technical Conference, Jun. 2004.

M. Castro et al., "SplitStream: high-bandwidth multicast in cooperative environments," in Proc. ACM SOSP'03, New York, USA, Oct. 2003.

V. Venkataraman et al., "ChunkySpread: Multitree unstructured peer-to-peer multicast", in Proc. The 5th International Workshop on Peer-to-Peer Systems, Feb. 2006.

Susu Xie, et al., "A measurement of a large-scale Peer-to-Peer Live Video Streaming System," icppw. p. 57, 2007 International Conference on Parallel Processing Workshops (ICPPW 2007), 2007.

D. Kostic et al., "Bullet: high bandwidth data dissemination using an overlay mesh," in Proc. ACM SOSP'03, New York, USA, Oct. 2003.

J. Liang et al., Dagstream: Locality aware and failure resilient peer-to-peer streaming. In Proceedings of S&T/SPIE Conference on Multimedia Computing and Networking (MMCN), Jan. 2006.

V. Pai et al., "Chainsaw: Eliminating Trees from Overlay Multicast," in International Workshop on Peer-to-Peer Systems, 2005.

X. Zhang et al., CoolStreaming/DONet: A Data-driven Overlay Network for Live Media Streaming. IEEE INFOCOM'05, Miami, FL, USA, Mar. 2005.

M. Zhang et al., "Large-Scale Live Media Streaming over Peer-to-Peer Networks through Global Internet," In the Proceedings of the first ACM International Workshop on Advances in Peer-to-Peer Multimedia Streaming, in conjunction with ACM Multimedia 2005, Nov. 2005.

M. Zhang et al., "On the Optimal Scheduling for Media Streaming in Data-driven Overlay Networks", In the Proceedings of IEEE GLOBECOM 2006, Nov. 2006.

M. Zhang et al., "Optimizing the Throughput of Data-Driven based Streaming in Heterogeneous Overlay Network". In the Proceedings of ACM Multimedia Modeling 2007, vol. 4351, Jan. 2007.

Y. Chen et al., Rainbow: A Locality-aware Peer-to-Peer Overlay Multicast System, Fifth International Conference on Grid and Cooperative Computing Workshops, 2006 (GCCW '06).

V. Pai et al., "Improving Robustness of Peer-to-Peer Streaming with Incentives", First Workshop on the Economics of Networked Systems. Jun. 2006.

N. Magharei et al., "Prime: P2P receiver-driven mesh-based streaming: Design and Evaluation," Tech. Rep. CIS-TR-06-05, 2006. [Online]. Available: http://mirage.cs.uoregon.edu/pub/tr06-05.pdf.

J. Li, "PeerStreaming: A Practical Receiver-Driven Peer-to-Peer Media Streaming System," Microsoft Research TR-2004-101, Sep. 2004.

* cited by examiner

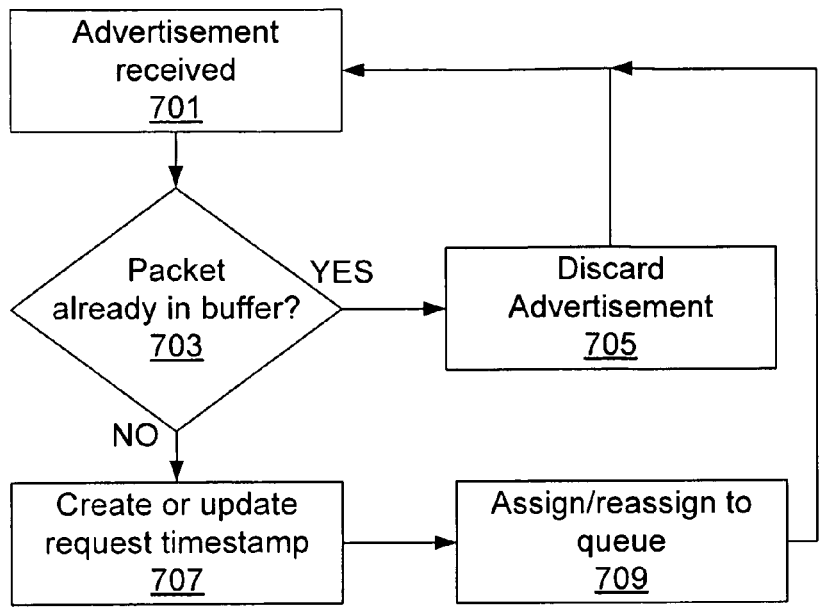
FIG. 7
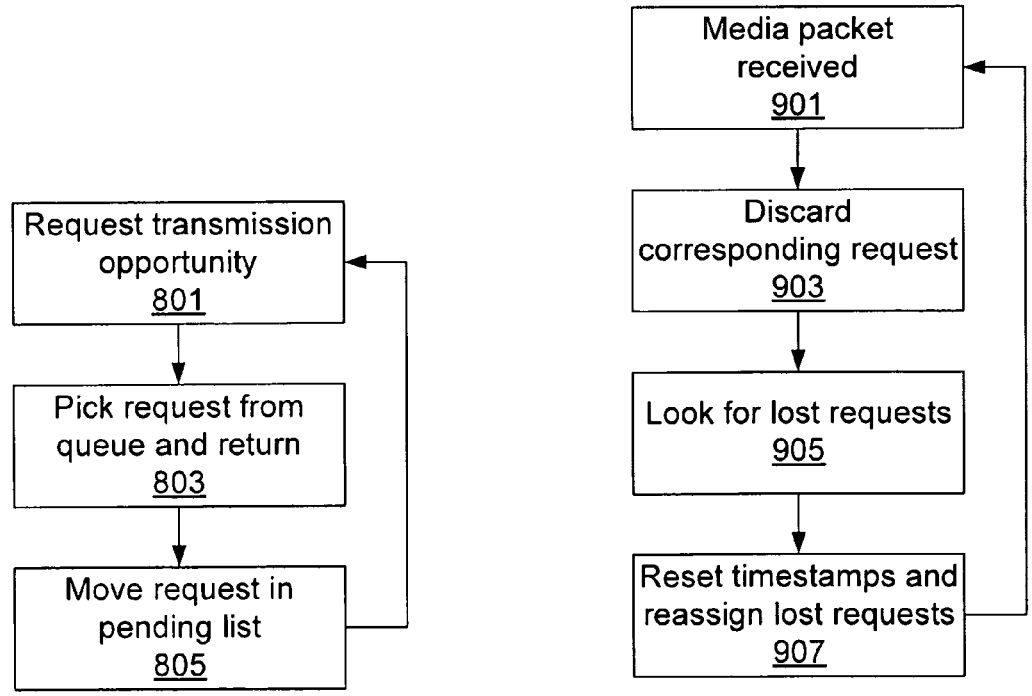
FIG. 8
FIG. 9

CONTINUOUS SCHEDULING FOR PEER-TO-PEER STREAMING

Aspects of the disclosure generally relate to peer-to-peer streaming of media streams to multiple receivers. In particular, aspects relate to overlay approaches for peer-to-peer streaming.

BACKGROUND

A peer-to-peer streaming system generally embodies two components for operation: topology construction and stream delivery. First, for each peer, a system finds and selects the peers that can supply the media. Secondly, the system arranges an effective way to forward the media stream from peer to peer.

A problem with current peer-to-peer streaming protocols is that creating and maintaining an efficient stream delivery topology is hard. Most systems perform well as long as conditions are relatively stable: peers do not join or leave the overlay and network conditions do not vary. However, when conditions change, current systems have difficulties.

BRIEF SUMMARY

This Summary is provided to introduce a selection of concepts in a simplified form that are further described below in the Detailed Description. This Summary is not intended to identify key features or essential features of the claimed subject matter.

Aspects relating to the distribution and receipt of packets of data between neighboring peer apparatus are described. In one example, an advertisement module of an apparatus distributes buffer content advertisements continuously to a plurality of neighboring peers joined in a network connected to the apparatus. The buffer content advertisements identify the stored packets of data in a packet buffer associated with the apparatus. The continuously distributed buffer content advertisements may include incremental updates of content of the packet buffer piggybacked to every outgoing packet of data from the apparatus. A neighborhood manager may determine when new neighboring peers join the network and manage connections to the plurality of neighboring peers. A scheduler module may determine packets of data, advertised by the plurality of neighboring peers that the apparatus does not have in the packet buffer.

According to another aspect, a communication module may receive buffer content advertisements continuously from a neighboring peer joined in a network. The buffer content advertisements identify the stored packets of data in packet buffers associated with the neighboring peer. The buffer content advertisements received continuously may include incremental updates piggybacked to every incoming packet of data. A scheduler module may determine packets of data, advertised by the plurality of neighboring peers that the apparatus does not have in the packet buffer. A communication module communicates requests for packets from the plurality of neighboring peers and communicates buffer content advertisements of the apparatus to the plurality of neighboring peers.

BRIEF DESCRIPTION OF THE DRAWINGS

Certain embodiments are illustrated by way of example and not limited in the accompanying figures in which like reference numerals indicate similar elements and in which:

FIG. 7 is a flowchart illustrating a method for managing advertisement arrivals in accordance with one more aspects described herein.

FIG. 8 is a flowchart illustrating a method for managing requests in accordance with one more aspects described herein.

FIG. 9 is a flowchart illustrating a method for managing media packet arrivals in accordance with one more aspects described herein.

DETAILED DESCRIPTION OF THE INVENTION

In the following description of the various embodiments, reference is made to the accompanying drawings, which form a part hereof, and in which are shown by way of illustration various embodiments in which the invention may be practiced. It is to be understood that other embodiments may be utilized and structural and functional modifications may be made without departing from the scope of the present invention.

Figure 1:
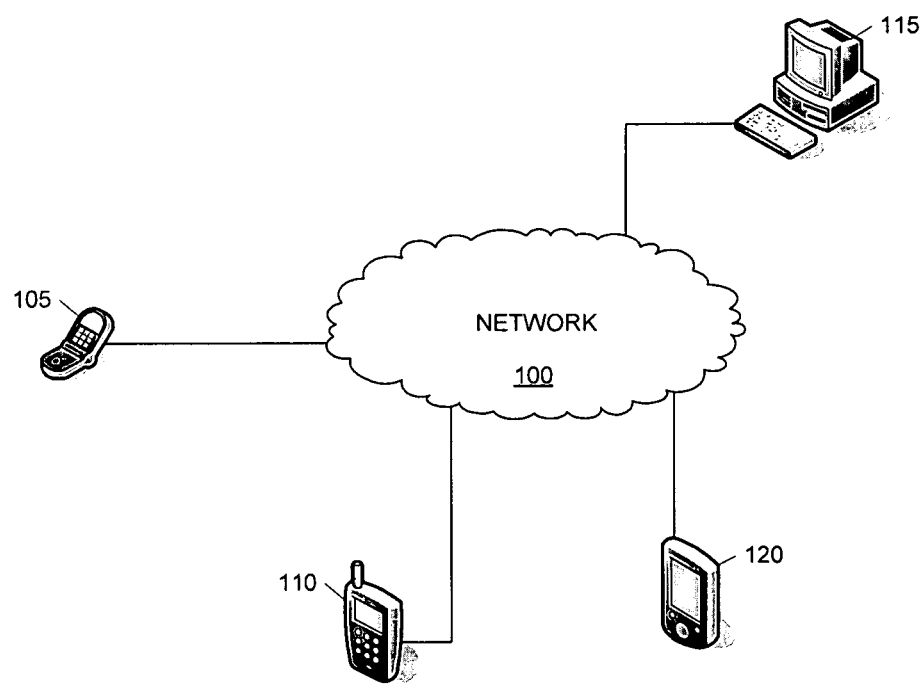
FIG. 1 illustrates a block diagram of a communication network in which one or more embodiments may be implemented.

Various embodiments may be used in a broad array of networks and communication protocols. FIG. 1 illustrates an example of a communication network through which data may be exchanged according to one or more aspects described herein. Specifically, communication network 100 includes mobile communication devices 105 and 110, personal computer (PC) 115 and personal data assistant (PDA) 120. PC, as used herein, is not limited to any particular operating system or platform. Communication through network 100 is not limited to the illustrated devices and may include other apparatuses such as a home video storage system, a portable audio/video player, a digital camera/camcorder, a positioning device such as a GPS (Global Positioning System) device or satellite, a mobile television, a STB (Set-top Box), a digital video recorder, and the like and in any combination of the aforementioned.

Devices 105, 110, 115 and 120 may be connected to each other through various types of networks. For example, mobile communication devices 105 and 110 may communicate with one another through a cellular network, a short range communication connection (such as a Bluetooth®, UWB (Ultra Wide Band), infrared, WiBree), a wireless local area network (WLAN) or a high-speed wireless data network, e.g., Evolution-Data Optimized (EV-DO) networks, Universal Mobile Telecommunications System (UMTS) networks or Enhanced Data rates for GSM Evolution (EDGE) networks. In one or more arrangements, mobile communication devices 105 and 110 and other devices like PC 115 and PDA 120 may communicate through a wired network. Further, devices 105, 110, 115 and 120 may use various communication protocols such as Internet Protocol (IP), Transmission Control Protocol (TCP), and Simple Mail Transfer Protocol (SMTP) among others known in the art.

Figure 2:
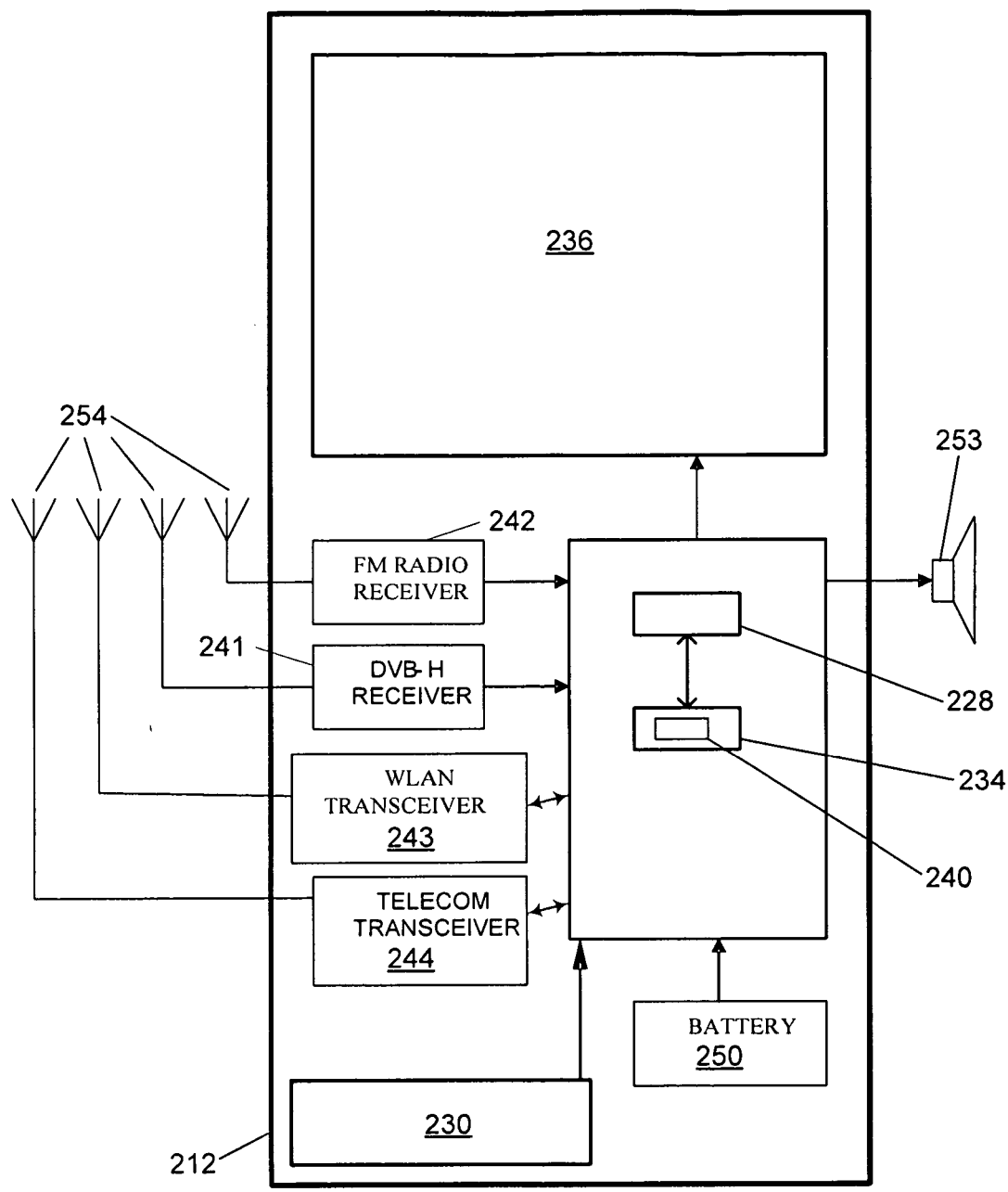
FIG. 2 illustrates a block diagram of a communication device in accordance with one or more aspects described herein.

FIG. 2 is a block diagram of a communication device such as mobile communication device 105 including processor 228 connected to user interface 230, memory 234 or other storage, and display 236. Communication device 212 may also include battery 250, speaker(s) 253, and antennas 254. User interface 230 may further include a keypad, touch screen, voice interface, one or more arrow keys, joy-stick, data glove, mouse, roller ball, and/or the like. Communication device 212 may comprise a computer, PDA, mobile telephone and/or the like.

Computer executable instructions and data used by processor 228 and other components within communication device 212 may be stored in a computer readable memory 234. The memory may be implemented with any combination of read only memory modules or random access memory modules, optionally including both volatile and nonvolatile memory. Software 240 may be stored within memory 234 or storage to provide instructions to processor 228 for enabling communication device 212 to perform various functions. Alternatively, one or more modules of communication device 212 may be embodied in hardware or firmware (not shown). Module as used herein refers either to one or more circuits configured to perform a function, or to executable instructions stored in a memory that can be executed by a processor.

Communication device 212 may be configured to receive, decode and process digital radio or television broadcast transmissions that are based, for example, on the DVB (Digital Video Broadcasting) standards, through a specific DVB receiver 241. The mobile device may also be provided with other types of receivers for digital broadcast transmissions, such as ATSC (Advanced Television Systems Committee), MediaFLO, DMB (Digital Multimedia Broadcasting), ISDB (Integrated Services Digital Broadcasting), HDTV (High-definition television), DAB (Digital Audio Broadcasting), DRM (Digital Radio Mondiale), etc. Additionally, communication device 212 may also be configured to receive, decode, and process transmissions through FM/AM Radio receiver 242, WLAN transceiver 243, and wireless telecommunications transceiver 244. Transceivers 243 and 244 may, alternatively, be separated into individual transmitter and receiver components (not shown). In one example, transceiver 244 may include a broadcast receiver (not shown) and a backward channel receiver (not shown) for communicating over the broadcast channel and the backward channel, respectively.

According to one aspect, communication device 212 may receive Radio Data System (RDS) messages. Other transmission and reception systems may also be used including BLUETOOTH®, WiMAX (Worldwide Interoperability for Microwave Access), i.e., Institute of Electrical and Electronics Engineers (IEEE) 802.16 standard, or UWB (Ultrawideband) transceivers. In one or more instances, signals may be transmitted to and received from another mobile terminal (not shown). For example, audio, video, and other signals may be transmitted between two communication devices using various transmissions protocols such as wireless local area networks (WLANs), General Packet Radio Service (GPRS), third generation mobile system technology (3G), Bluetooth and/or Universal Plug and Play (UPnP). Such networks may be used to access or support local networks or remote networks such as the Internet.

Peer-to-peer streaming is a method to distribute media streams (e.g., voice and/or video) to multiple receivers. The approach is to let all network peers contribute in stream forwarding, i.e., in addition to receiving the stream, the stream viewers also forward it to other peers. Currently there are several approaches for peer-to-peer streaming. Four common approach categories include an application-level multicast tree approach, a multi-tree approach, a mesh-based approach, and a data driven approach.

In an application-level multicast tree approach, e.g., overlay multicast, each peer forwards the media stream, as it is, to a few other peers in such a way that the peers form a tree topology. The approach is known to work in practice but scales weakly for many reasons. The leaf peers cannot contribute, and interior peers must support relatively large output bandwidth. Furthermore, tree breakages must be repaired.

Multi-tree approaches, e.g., SplitStream, a multi-tree-based streaming algorithm developed by Microsoft Research, ChunkySpread, a multi-tree-based streaming protocol developed in Cornell University, Ithaca, N.Y., and CoolStreaming, a multi-tree based streaming algorithm developed in Roxbeam Corp., split the stream in multiple substreams, typically 4-8, and use several parallel trees to multicast the substreams. In a multi-tree approach, each peer needs to join every tree, or an adequate number of trees, in order to receive all, or an adequate number of, the substreams in order to re-generate the original stream.

Mesh-based approaches, e.g., Bullet, a mesh-based streaming protocol developed in Duke University, and DagStream, a mesh-based streaming protocol developed in University of Illinois, Urbana-Champaign, create an explicit mesh topology. Content is typically split in multiple small pieces that are then distributed across the mesh.

Finally, a data-driven overlay approach, e.g., Chainsaw, a data-driven streaming protocol developed in Stony Brook University, and DONet/CoolStreaming, a data-driven streaming protocol developed in Hong Kong University of Technology and Science, similarly to a mesh-based approach, splits content in multiple small pieces that are then distributed across the network. The network topology is, however, very dynamic and depends on piece availability.

In the content delivery mechanism in current data-driven overlay approaches, such as ChainSaw and DONet/CoolStreaming, the media stream is split in small pieces, e.g., 1 second of media. Each peer has a buffer to store these pieces, e.g., 30-120 seconds, and it periodically, e.g., once in a second, advertises the buffer content to its neighbours. Under the current data-driven overlay approaches, all peers periodically, e.g., once a second, run a scheduling algorithm in order to determine which new pieces to next request from neighbouring peers.

Scheduling is typically done in such a way that each peer has an area of interest in the buffer where it is currently collecting pieces in more or less random order. This "swarming area" is a moving window in the content stream, and it makes it possible to actually exchange pieces. When the swarming areas of two neighbouring peers overlap and contain at least some disjoint pieces, the neighbours can both contribute pieces to each other. The actual scheduling policies of existing solutions vary. For example, the Chainsaw algorithm uses pure random scheduling, requesting random pieces from the available ones in the swarming area, while DONet improved over that by preferring rare and urgent pieces.

For joining time, even with good systems operating in favorable conditions, joining a new peer may take 10-15 seconds. In flash crowd situations, where the number of peers changes suddenly by orders of magnitude, joining times may be very long, e.g., minutes, or joining may entirely fail, such as over 25% of new users must re-try joining. Finally, many peers, even over 50%, do not contribute for one reason or another.

Data-driven streaming, due to its continuous dynamism in the manner for selecting the contributing peers, has potential to address changing conditions. However, the current approaches suffer from several problems because they operate periodically.

Due to periodic advertisements, each peer's knowledge of its neighbor's buffer status is out of date. Thus decisions made in a scheduling algorithm may be based on outdated information. Periodic advertising and scheduling implies a large "buffer lag." Buffer lag, as such, is present in all streaming solutions, whenever a peer A is sending media to a peer B, peer B inevitably lags peer A in time. The consequence is that the further away that peers are from a media source, the more they lag the media source in time. When data dissemination is controlled by periodic operations, such as advertisement and scheduling, whose period is considerably longer than communication round-trip time, the lag is the same order of magnitude as the period. For current data-driven streaming, the lag is typically a couple of seconds per hop.

One approach to address the problems of data-driven streaming is to use a push-pull mechanism introduced, e.g., in GridMedia, a data-driven streaming protocol developed in Tsinghua University, Beijing, China. GridMedia addresses the end-to-end latency problem and is essentially a hybrid of multi-tree and data-driven streaming. In addition to packetizing the stream in small pieces, the stream also is divided in substreams that consist of every Nth piece. Each peer can then obtain data from its neighbors in two possible ways. In pull mode, the peer gets content advertisements and requests packets similarly to DONet. In push mode, the peer makes a persistent request for a whole substream; the neighbor automatically pushes all the pieces belonging to the requested substream without an explicit request. Push mode implies smaller latency; however, in push mode, the solution behaves essentially like a multi-tree protocol with all the problems associated with a multi-tree protocol.

GridMedia developers also have published optimal periodic scheduling algorithms, such as Data-driven Overlay Network (DON), a periodical scheduling algorithm for data-driven streaming, developed in Tsinghua University, Beijing, China, and Data-driven Overlay Network using Layered coding (DONLE), a periodical scheduling algorithm for data-driven streaming, developed in Tsinghua University, Beijing, China, to be used with a data-driven mechanism. These are, however, theoretical works and do not actually address any of the above noted problems. Instead, these algorithms attempt to optimize the throughput of periodic scheduling.

Aspects of the present disclosure improve the content delivery mechanism in a data-driven overlay approach for peer-to-peer media streaming. The advertisement and scheduling algorithms are run continuously and not periodically.

In accordance with one or more aspects of the present disclosure, a media stream may be split into small packets, such as the size of a single, non-fragmented IP packet. Each peer may have a buffer to store a number of these packets. Peers continuously may get incremental advertisements about the buffer content of their neighbour peers and may be running the scheduling algorithm all the time. The advertisements may be fed in the scheduler, one by one, immediately when they arrive. The scheduler may output packet requests, which may be sent to neighbour peers. The neighbour peers may return packets according to the requests.

Instead of getting a buffer map advertisement, e.g., once a second by conventional periodic intervals, a peer may receive incremental updates to a neighbour buffer map piggybacked to every incoming packet, typically 30-50 times a second. In addition, instead of running a scheduling algorithm, e.g., once in a few seconds to schedule several packet requests, the algorithm may run continuously. The incoming advertisements immediately may be fed in a scheduler that maintains a plan to fetch missing pieces from neighbour peers. This plan may be updated each time a new advertisement arrives so that it is always up-to-date. Still further, instead of responding to periodical packet requests, containing request for several packets, a continuous data flow may be maintained between peers. A receiving peer continuously may pick requests from its scheduler and may send them to a contributing peer. The contributing peer continuously may send packets back to the requestor. The protocol may seek to keep as few pending requests out as possible.

Figure 3:
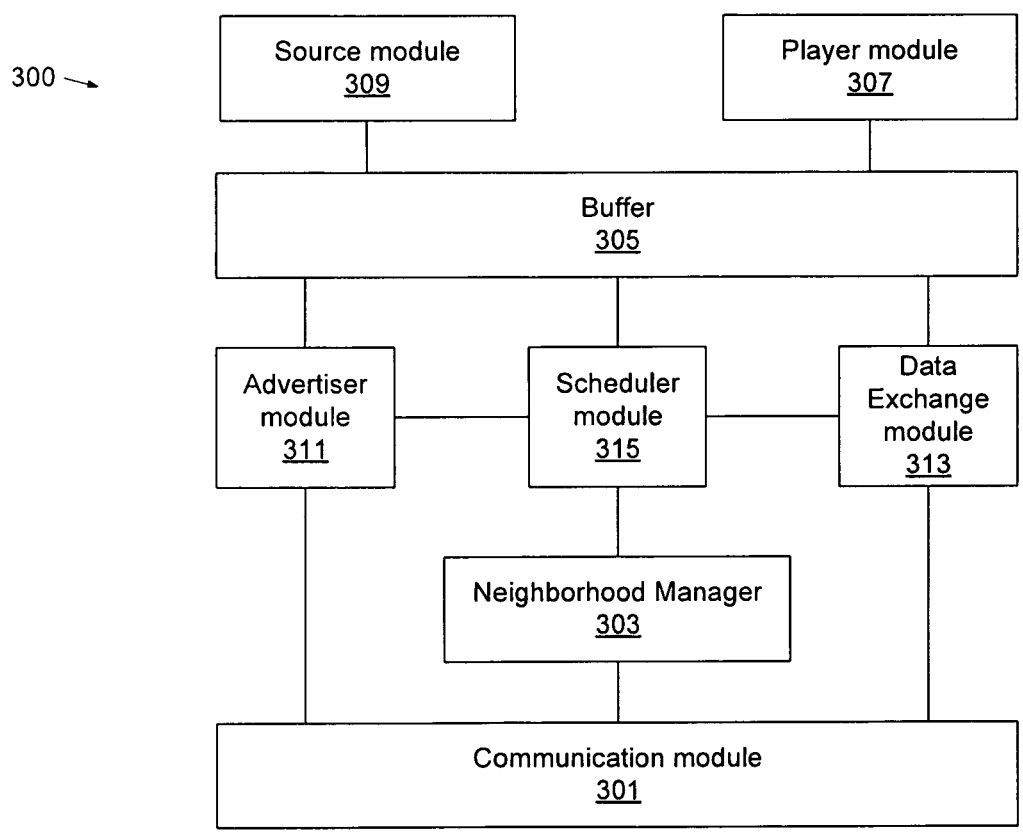
FIG. 3 illustrates a block diagram of an operational environment in accordance with one or more aspects described herein.

FIG. 3 illustrates a block diagram of an operational environment 300 in accordance with one or more aspects described herein. The system 300 in FIG. 3 is shown to include eight components. A neighbourhood manager 303 may be configured to discover other peers in a network and manage connections to them. A media buffer 305 may be configured to store media packets. An advertiser protocol module 311 may be configured to distribute buffer content advertisements to neighbour peers. A scheduler module 315 may be configured to maintain a download plan for missing packets. A data exchange protocol module 313 may be configured to request packets from neighbour peers. A media source module 309 may be configured to operate only in the source peer and may import new packets in the buffer 305. A media player module 307 may be configured to copy packets from the buffer 305 to an external media player. Below the modules is shown a communication module 301 that may be configured to pack all data in User Datagram Protocol (UDP) packets and maintain a steady data flow between neighbouring peers. Each of the different components is discussed further below.

All communication between peers occurs over a protocol. As described in these examples included, the communication between peers occurs over the User Datagram protocol (UDP); however, it should be understood by those skilled in the art that other protocols may be used in place. Communication module 301 may be configured to maintain a steady data flow to neighboring peers and may adjust the data rate constantly according to need and network capacity. For example, a known rate control protocol like TCP-Friendly Rate Control (TFRC) may be used.

The modules that desire to exchange data with peers, such as advertiser module 311, neighborhood manager 303, and data exchange module 313, may express to communication module 301 that they need to send out data. Communication module 301 then may pack the data in UDP packets and may send the packets out to neighbor peers.

Thus, for example, when advertiser module 311 desires to send an advertisement, it may inform communication module 301 about pending advertisements. Then, communication module 301 may look for the most appropriate way to send advertisements to peers without unnecessary delay by either piggybacking them to a data packet or sending them in a separate packet.

Neighborhood manager 303 may be configured to find new peers and connect to them. With respect to an actual protocol to find peers, there are several possible alternatives. A centralized tracker, a distributed tracker, based on, e.g., a Distributed Hash Table, and/or gossiping protocol may be used. Neighborhood manager 303 may be configured to maintain knowledge of a random set of other peers. This knowledge may include the transmission addresses, e.g., IP address and UDP port, of the peers and may be infrequently updated, with intervals of tens of seconds or longer.

To bootstrap, a peer first may connect to a known rendezvous point, e.g., a known host that is able to provide an initial list of peers. Such may be direct or indirect depending on the approach. Thereafter, neighborhood manager 303 may select a few peers, such as around 4-8, in random and may ask the communication module 301 to create a connection to them. These peers subsequently are called neighbors. After the connections have been set up, the other modules may initiate the streaming.

During streaming, neighborhood manager 303 may monitor the connections to neighbor peers. For monitoring, neighborhood manager 303 may receive data concerning how much data the peer contributes from scheduler module 315 and also data concerning data rate from communication module 301. Neighborhood manager 303 continuously may attempt to improve the performance, such as by dropping connections to weak peers and creating new connections to randomly selected new peers. However, neighborhood manager 303 may be configured to avoid being too aggressive.

Figure 4:
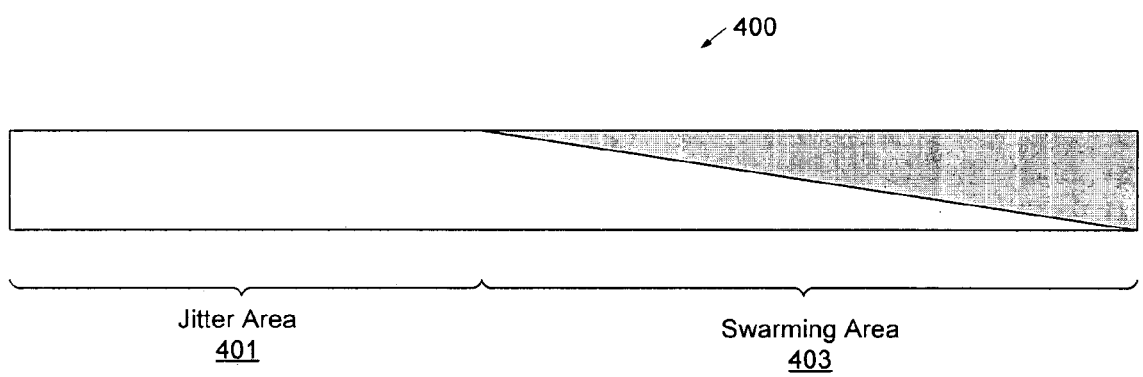
FIG. 4 illustrates an example packet buffer for storing media packets in accordance with one or more aspects described herein.

Packet buffer 305 may store media packets. In one illustrative example, the size of packet buffer 305 may be in the range of 256-512 packets, depending on the supported stream rate. Packets may be identified with sequence numbers, such as a 16-bit unsigned integer as the sequence numbers can wrap over. FIG. 4 illustrates an example packet buffer 400 for storing media packets.

Packet buffer 400 is shown divided in two areas. At the head side, a jitter area 401 is shown. Jitter area 401 is where the buffer 400 has no gaps, e.g., this area is needed to eliminate jitter for playing. Jitter area 401 is configured to act as a reserve so that there is time to handle changing conditions, i.e., switching neighbor peers. At the tail side, a swarming area 403 is shown. During swarming area 403, the peer actively may be collecting packets. The density of packets at swarming area 403 is decreasing; the further away, the fewer packets. Both areas 401 and 403 may be moving windows, and both may shift forwards in the course of time. The boundary between jitter area 401 and swarming area 403 may be dynamic. Player module 307 normally may read packets from the beginning of jitter area 401, but in unfavorable conditions, player module 403 may proceed to swarming area 403 where frame drops are possible.

In accordance with one illustrative example, media packets may carry multiple Real-Time Transport Protocol (RTP) streams so that each media packet also contains an RTP timestamp and stream ID. Saving the entire RTP header also may be an option. Packet buffer 305 also may be configured to store the stream description for the RTP streams.

Player module 307 may be configured to read packets from packet buffer 305 and send the read packets to an external media player. In accordance with one illustrative example, the external media player may access the media through a standard RTSP/RTP protocol. Player module 307 may be configured to ensure correct timing to avoid overflowing the jitter buffer of the player. In accordance with one or more aspects of the present disclosure, player module 307 may send media packets out to an external media player according to the RTP timestamps of the media packets.

Source module 309 may be configured to push new packets in to a packet buffer of the source peer 300. In accordance with one illustrative example, source module 309 receives packets from an external streaming server that, in turn, may read media, e.g., from a file, through standard RTSP/RTP protocol. In another illustrative example, source module 309 may be configured to save the stream description in packet buffer 305.

Advertiser module 311 may be configured to distribute knowledge of buffer content to neighbour peers. Advertiser module 311 may operate continuously and may keep neighbour peers up-to-date. When a new connection to a neighbour peer is created, advertiser module 311 first may send a packed image of its entire buffer map and thereafter only incremental updates may be sent. As should be understood by those skilled in the art, each module, as described herein, may comprise computer readable instructions that carry out the functions corresponding to that module.

Figure 5:
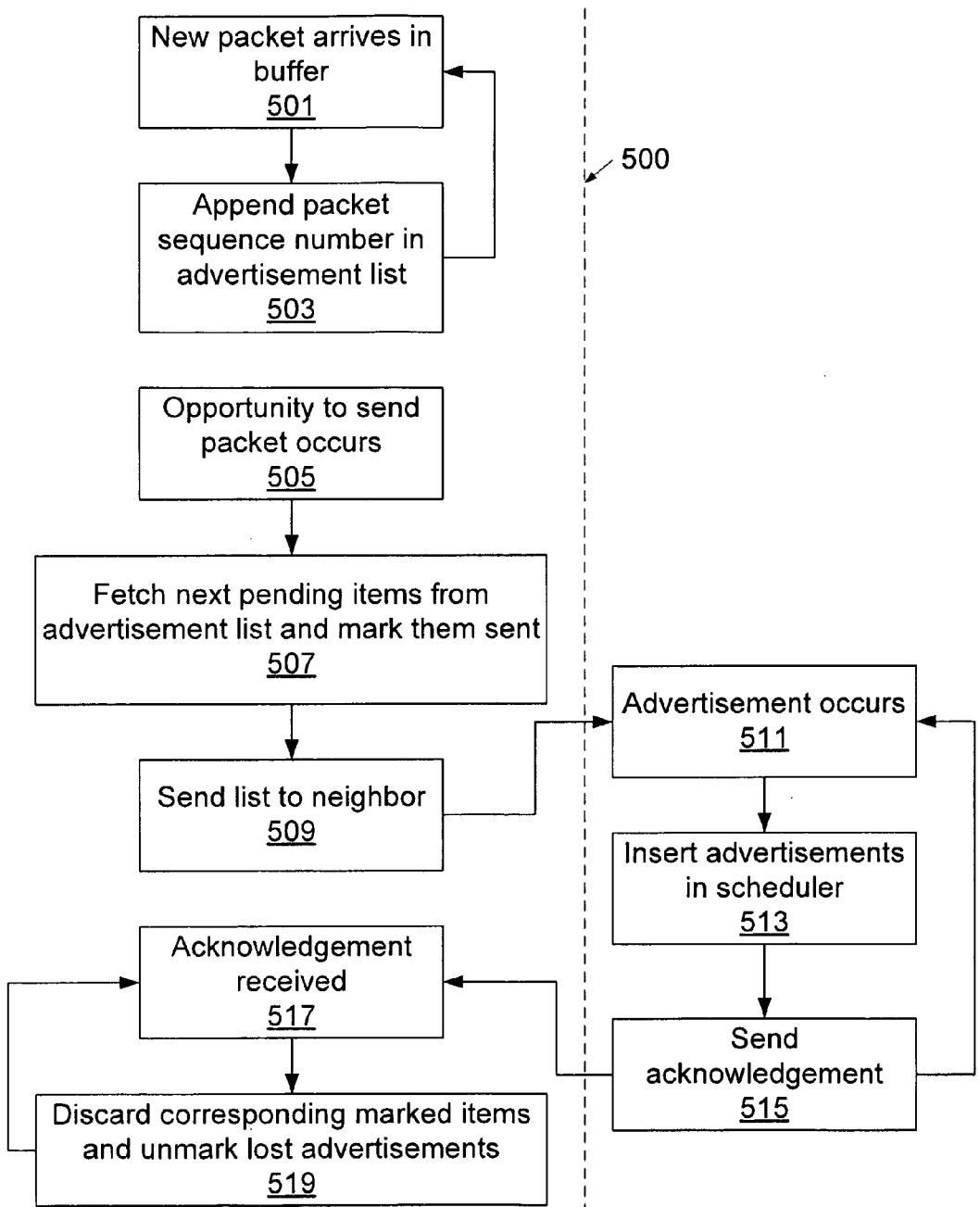
FIG. 5 is a flowchart illustrating a method for distributing knowledge of buffer content to neighbor peers in accordance with one more aspects described herein.

FIG. 5 illustrates an illustrative incremental advertisement process. To ensure reliable transmission, a retransmission scheme may be implemented. As illustrated in this example, steps on the left of the dashed line 500 occur in a sending peer, and steps on the right side of the dashed line 500 occur in a receiving peer. As shown, a sending peer first may receive all incremental modifications to buffer content in a transmission queue in step 501. This transmission queue may be an advertisement list of packet sequence numbers appended with the received packets in step 503. There may be a separate advertisement queue for every neighbour peer.

An opportunity to send a packet to a neighbour peer may occur in step 505. A communication module then may look at the transmission queue and may fetch the next pending items from the advertisement list and mark them as sent in step 507. In step 509, the communication module may send the sequence numbers in the transmission queue to the neighbour peer. As advertisements are continuously made, the advertisement list is, in normal conditions, relatively short, approximately as many packets as there are neighbours, and the entire list may be piggybacked in a data packet. In exceptional cases, the advertisement list may increase and then a communication module has an option to send a larger advertisement, in its own packet, or even send an entire buffer map. As should be understood by those skilled in the art, an advertisement may include a sequence number, data, and/or both with respect to content of a buffer of the advertising peer.

A receiving peer, the neighbour peer, may receive advertisements in step 511 and may feed the incoming advertisements to a scheduler module in step 513. The receiving peer then may send back an acknowledgement in step 515. When the sending peer receives the acknowledgement in step 517, the sending peer may discard the marked items from the transmission queue in step 519. If some packets are lost, either the advertisement or acknowledgement, the advertisement items in the queue may be unmarked and re-transmitted in step 519 also.

For normal peers, all packets in a buffer are advertised. However, to increase buffer diversity, efficient swarming suggests that the buffers of neighbours have different content, and a random fan-out algorithm may be implemented in the source peer. So, instead of advertising all packets, the source peer explicitly creates a swarming area in its advertised buffer map; in the tail side of the buffer, only randomly selected packets are advertised. The packet density in the advertised buffer follows the generic decreasing density principle as shown in FIG. 4.

To generate such density, each new packet may be advertised with probability N/(N+i), where N is a constant that determines the size of the swarming area and i is the distance of the packet from the beginning of the swarming area. Such leads to linearly decreasing density in the swarming area.

Other fan-out schemes are also possible in addition to the above described random scheme. For example, if a source node has K neighbour peers, the source node may advertise every $K^{th}$ packet to each neighbour. Random fan out gives enough diversity for efficient swarming as long as the pending number of advertised packets is small relative to the length of the swarming area.

Data exchange module 313 may be configured to exchange media stream packets between peers. The process may be receiver-driven and it may be controlled by a communication module and/or a scheduler module. As described above, a communication module, such as communication module 301, may be configured to maintain a steady data rate between neighbor peers.

The data exchange between neighbors may begin by a receiver peer sending a request to a media provider. Whenever a communication module of the receiver peer has an opportunity to send a packet to the media provider, the communication module may pick a request from a scheduler module, such as scheduler module 315. Such a request may be a sequence number of a packet. The communication module may send the request to the media provider. The request may be piggybacked to a packet, which may be a media data packet going in the opposite direction, and also it may carry advertisement or its acknowledgement.

When the media provider receives the request, the media provider sends the corresponding media packet back in the next possible opportunity. The recipient inserts the packet in its buffer, such as buffer 305, and updates its scheduler module, such as scheduler module 315. To cope with possible packet loss, the requests may be marked in the scheduler module as sent and, if the corresponding packet does not arrive, the request may be reinserted in the scheduler module. Loss detection may be based on timer and/or comparing the arriving packets to sent requests.

The communication module may control the data flow and may keep as few outstanding requests as possible. The intention is that requests are queued in a scheduler module rather than in the media provider. As long as a request is queued in a scheduler module, the scheduler module does not need to assign the request to a particular provider before it needs to be sent.

Scheduler module 315 may be configured to assign each advertised packet that the peer does not yet have to a neighbour peer that may provide the packet, and configured to arrange the requests in a suitable order. For data-driven streaming, the following criteria may be used when assigning packets. The maximum data rate from the neighbour peer may not be exceeded. Rare packets, i.e., packets available only from a few neighbour peers, may be fetched early. Urgent packets, i.e., packets whose playing time is close, may be fetched early. In accordance with one or more other embodiments, random assignment in random order may be implemented.

Figure 6:
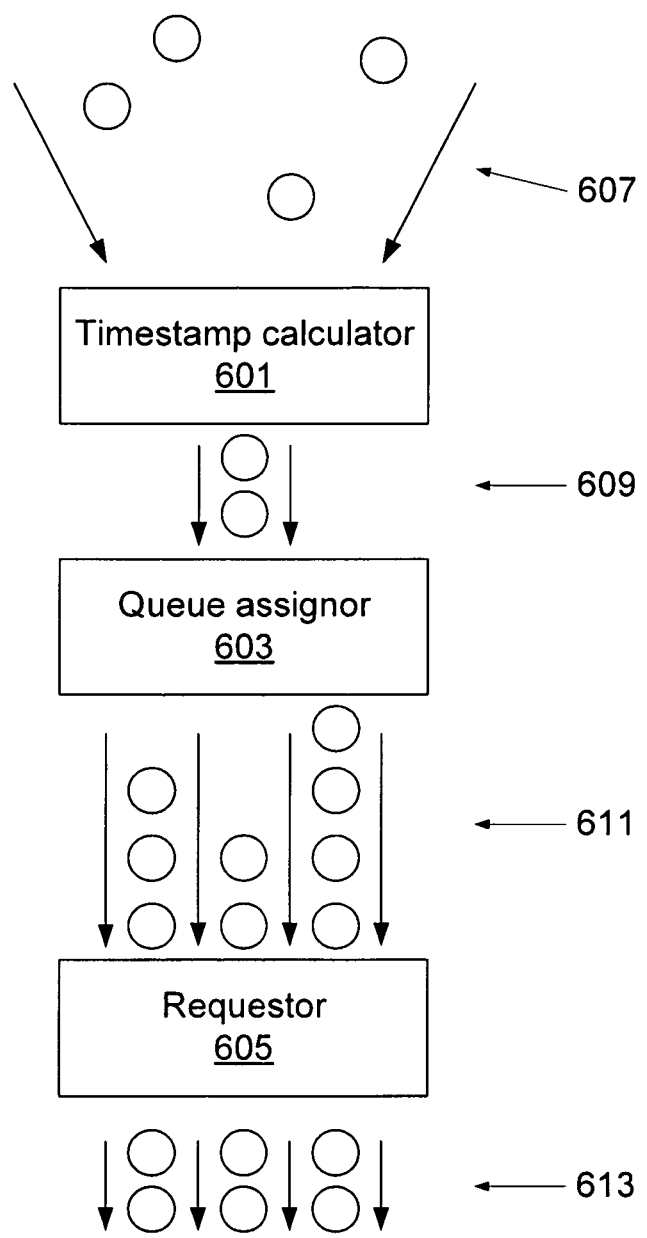
FIG. 6 is a block diagram illustrating a structure of an example scheduler module in accordance with one more aspects described herein.

Aspects of the present disclosure utilize an algorithm that allows continuous execution. FIG. 6 is a block diagram illustrating a structure of an example scheduler module in accordance with one more aspects described herein. The input to the algorithm may include packet advertisements 607 and arriving packets, and the algorithm outputs may be requests for new packets. Internally, the algorithm may maintain an assignment queue 611 for each neighbour peer. Such a queue may contain those requests that are tentatively assigned to the neighbour peer in the order the requests are to be requested. Assignments may be tentative so external events, e.g., arrival of new advertisements, change in link conditions, etc., may be allowed to change the assignment.

Advertisements 607 come from neighbour peers and are received by a scheduler module, which first may assign a virtual timestamp to each request by timestamp calculator 601. This timestamp may denote a moment in time when the packet should be requested. The timestamp may be created by adding three elements to the current time, while the current time is the timestamp of the packets being currently requested. The three elements include a rarity element that is proportional to the number of neighbours having the packet. Such may be estimated with the number of neighbours having advertised it. For rare packets, the number of neighbours having the packet is small, thus meaning an earlier time for sending the request. Another element is an urgency element that is proportional to the time when the packet is required. For urgent packets, the time when the packet is required is small, thus meaning an earlier time, and may even be negative. The third element is a random element. In this case, a random number may be added to the time value. Performing such an addition causes the requests eventually to be sorted in a random order, biased with rarity and urgency, when they are sorted according to timestamps. When requests are then sent to the provider in this order and the provider has returned packets, there is a biased random selection of packets in the swarming area, such as shown in FIG. 4. The distribution of the random numbers is not necessarily uniform. It is a parameter that may be used to fine-tune the algorithm. The requests 607 may then be ordered by virtual timestamps as shown by reference element 609. The ordered requests 609 may then be stored in an assignment queue 611. Queue assignor 603 may be configured to assign an ordered request to one of the neighbour peers as shown by reference element 611. The scheduler, in general: (1) may decide in which order/when to request each packet, handled by the timestamp calculator, and (2) may decide from whom to request the packet, handled by the queue assignor. The queue assignor may split the incoming flow of time stamped requests 609 and may store each of them to one of the queues 611. There may be one queue per neighbor. The queue assignor also may move requests from a first queue 611 to another queue 611 whenever it needs to. Only the neighbours who have advertised the packet are valid. In addition, the sustainable data rate from the neighbour, which may be obtained from a communication module, may be accounted for to avoid congested neighbour peers. In one example, it may be desired to avoid requesting too much from a neighbor. As such, the data rate from each neighbor may be limited. The communication module may maintain an estimate of the maximum data rate from the neighbor, e.g., packets per sec. By knowing it, a scheduler may estimate how fast each queue proceeds. With this element, a queue assignor knows how "full" each queue is. The requests that are not sent may be stored in queues 611. In this context, with respect to the internals of a scheduler, requester 605 is the entity wanting a request every now and then. There may be many requesters. Concretely, the requester may be the data exchange module 313 asking for the next request to a neighbor. A data exchange module may work in close co-operation with a communication module. A data exchange module may know at which rate media packets may be sent and received. It may determine the rate at which requests are sent to each neighbor. A communication module may determine the exact moments of time when UDP packets are transmitted and what is packed in them. The lists 613 below the requester are storages for the pending requests. These are discarded when packets arrive or are re-fed in the scheduler if packet is lost. If a packet is rare, the few valid queues may be congested. In such an occurrence, other assignments may be moved to other queues.

FIG. 7 is a flowchart illustrating a method for managing advertisement arrivals in accordance with one more aspects. When a new advertisement arrives at a peer in step 701, the process moves to step 703 where a determination is made as to whether a scheduler module of the peer already has the packet in its buffer, such as buffer 305. If yes, the process moves to step 705 where the advertisement may be discarded. If no and the scheduler module already has a request for the packet, if a tentative request exists, the tentative request may be updated, e.g., its rarity element may change in step 707, and the tentative request may be reassigned, e.g., moved to a different queue, in step 709. In another illustrative example, a new tentative request may be created, given a timestamp, and assigned to a queue.

FIG. 8 is a flowchart illustrating a method for managing requests in accordance with one more aspects, for how a requester, such as requester 605, e.g., a data exchange module, picks a request from a scheduler. A data exchange module may decide that it is time to create a new request to a neighbor A and a communication module may agree that it is able to send it out. Such may be referred to as a "request poll" 801. Upon this poll, the requester picks at step 803, a request from the head of the queue 611 of neighbor A and moves at step 805, it in the list 613 of pending requests from neighbor A. If the queue 611 of neighbor A is empty, the requester also may search for a request from some other queue. This may not lead to reassignments except in cases where the assignment queue is empty. In such an example, a request may be searched from other queues. The sent requests may be marked as sent and retained in a separate list as in step 805. An advertiser may have a separate and independent process. For example, a source peer may run an advertiser, such as in a fan-out mode, but may not run a scheduler, as it gets all the packets from a source. The other peers may run both.

FIG. 9 is a flowchart illustrating a method for managing media packet arrivals in accordance with one more aspects. When a media packet is received at the scheduler module in step 901, the scheduler module may be checked for the corresponding request that is usually in the list of sent requests 613 but may also be found in assignment queues 611 if a retransmission operation has taken place. The corresponding request then may be discarded in step 903. If the packet was in the list of sent requests, suitable heuristics may be run to detect possible lost requests/packets in step 905. Loss detection alternatives include a retransmission timer. A scheduler estimates a deadline for the packet arrival and saves this in each sent request. Another alternative is a request/return pattern matching. A scheduler remembers the order in which requests were made and assumes that packets will be returned in the same order. A missing packet from the input flow is interpreted as loss. Still another alternative is a more complicated pattern matching to support minor re-ordering of the packets. A receiver maintains a moving window for the few (3-8) next expected packets that may arrive in any order. The window moves forwards whenever its first packet arrives. Arrival beyond the window triggers loss. The main practical difference between these is the tradeoff between fast loss detection and false alarms. If a loss is detected, the lost requests may be reinserted to the scheduler module with new reset timestamps and reassigned in step 907. The scheduler now knows which neighbors have the packet and generates a new timestamp for it. The timestamp may depend on the rarity, urgency, and/or random elements. While rarity has not changed, the packet has become more urgent. Thereafter, the queue assignor inserts the request in some of the queues 611.

A scheduler module also may react when a link is lost or its quality decreases. If a link is lost, all requests in the assignment queue of the link need to be reinserted. If there is a decrement in quality, i.e., rate drop, the assignment queue may be checked and requests possibly may be moved to other queues.

Under normal conditions, the total number of tentative requests in a scheduler module is small and roughly constant. However, when a new peer joins the network, it first gets large advertisements, i.e., the entire buffer map, from its neighbour peers. To avoid an enormous backlog, in accordance with one or more embodiments, a scheduler module first may determine the most suitable point to start the media stream and may begin scheduling packets only after that point. The initial advertisements may contain all the packets the neighbours have and, by looking at them, a scheduler may determine the boundaries of the jitter and swarming areas in the neighbour packet buffers. For an effective swarming, these areas may be relatively close to each other so, if some neighbour, for example, lags others a lot, it may be dropped immediately. The newcomer desires to form a swarming area, such as shown in FIG. 4, and it takes some time to get enough packets for that. To keep in pace with its neighbours, who are advancing all the time, it is better for the newcomer to avoid starting from a too early position. The most optimal starting point lies in one of the tuning parameters of an algorithm in accordance with one or more aspects of the present disclosure. A simple heuristics is to start at the middle of the swarming area of the "peloton," the average mid-point of swarming areas without taking in account the possible lone leaders that are far ahead the other neighbours.

Due to constant, incremental advertisements, each peer has up-to-date knowledge of its neighbor peer's buffer status. As such, decisions made in a scheduling algorithm may be based on up-to-date information. Furthermore, final decisions for packet scheduling may be postponed as much as possible. As advertising and scheduling is continuous, the buffer lag between peers is small, essentially in the same order of magnitude as transmission round-trip time, e.g., tens of milliseconds. As buffer lag is small, it is possible to achieve effective swarming even with a relatively small swarming area. As such, a 5-10 second buffer may be adequate. Small buffer lag and swarming area also implies short end-to-end latency.

Using continuous scheduling for data-driven approaches also solves some problems that are associated to multi-tree protocols. A protocol may react faster to changing network conditions or churn, e.g., new or leaving peers. Multi-tree protocols typically react slowly, e.g., 10 seconds after the incident, and must initiate a peer search algorithm that may take up to 30 seconds to repair a failed tree. Continuous scheduling may, in turn, react in fragments of a second. In addition, while multi-tree protocols need a discontinuous topology change, i.e., cut and attach branches in the substream tree, continuous scheduling allows a continuous topology change, e.g., gradually changing the rate at which packets are requested from different neighbors.

With respect to small handheld devices, aspects of the present disclosure allow for a relatively short buffer, probably below 1 MB. For a usual streaming implementation, the data buffer may consume most of the memory. Thus, certain embodiments are likely to fit also in smaller devices.

In addition, the continuous scheduling aspects may be run in small increments so that a device CPU never needs to be occupied in scheduling for prolonged periods. Thus, certain embodiments may assist devices that have limited processing power and need to perform time-critical operations simultaneously, like playing a video.

In accordance with still other embodiments, the source node of the stream may be changed relatively quickly, i.e., within a few seconds. With periodic scheduling, changing a source node takes tens of seconds, and with multi-tree approaches, it practically means joining to a new overlay taking again tens of seconds. Aspects of the present disclosure allow for more interactive streaming or streaming from multiple sources.

In accordance with still other embodiments, the readiness of a peer may be monitored before the stream can be given to the player. This information may be used for end-user convenience as one can show a progress bar. Conventional systems spend most of the initialization time searching for other peers and their readiness cannot be estimated.

The invention is not limited to data-driven overlay approaches. These aspects may apply also to, e.g., multi-tree or mesh approaches. An algorithm may be run continuously that tries to improve the network topology and/or adjust to changing conditions.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

I claim:

1. An apparatus comprising:
   a communication module configured to distribute data from and receive data to the apparatus;
   a packet buffer configured to store packets of data; and
   an advertisement module, operatively connected to the communication module and the packet buffer, configured to maintain a continuous data flow between the apparatus and a plurality of neighboring peers joined in a network connected to the apparatus at least in part by:
      sending, to a neighboring peer, a buffer map identifying packets of data stored in the packet buffer; and
      then distributing, through the communication module to the neighboring peer, one or more buffer content advertisements identifying incremental updates of content of the packet buffer relative to the sent buffer map, piggybacked to outgoing packets of data from the apparatus to the neighboring peer.

2. The apparatus of claim 1, further comprising a neighborhood manager configured to determine when new neighboring peers join the network and to manage connections to the plurality of neighboring peers;
   wherein, upon the apparatus making connection to a new neighboring peer, the advertisement module distributes an image of a buffer map identifying the packets stored in the packet buffer to the new neighboring peer.

3. The apparatus of claim 1, further comprising a scheduler module configured to determine packets of data advertised by the plurality of neighboring peers that are not stored in the packet buffer.

4. The apparatus of claim 3, wherein the scheduler module further is configured to assign a timestamp to requests received from the neighboring peers.

5. The apparatus of claim 4, wherein the timestamp includes at least one of a rarity element, an urgency element, and a random element.

6. The apparatus of claim 1, further comprising a data exchange module configured to request packets of data advertised by the plurality of neighboring peers that are not stored in the packet buffer from at least one of the plurality of neighboring peers.

7. The apparatus of claim 1, wherein the continuously distributed buffer content advertisements include a probability $N/(N+i)$, where N is a constant that determines a size of a swarming area and i is a distance of a packet from a beginning of the swarming area.

8. A computer-implemented method comprising maintaining a continuous data flow between a computing device and a plurality of neighboring peers joined in a network connected to the computing device at least in part by:
   sending, by the computing device to a neighboring peer, an image of a buffer map identifying data packets stored in a packet buffer of the computing device; and
   then distributing, by the computing device to one of the plurality of neighboring peers, one or more buffer content advertisements identifying incremental updates of content of the packet buffer relative to the image of the buffer map, piggybacked to outgoing packets of data from the apparatus to the neighboring peer.

9. The computer-implemented method of claim 8, further comprising:
   determining, by the computing device, when new neighboring peers join the network;
   managing connections, by the computing device, between the computing device and the plurality of neighboring peers; and
   upon making connection to a new neighboring peer, distributing an image of the buffer map identifying the packets stored in the packet buffer to the new neighboring peer.

10. The computer-implemented method of claim 8, further comprising determining, by the computing device, packets of data advertised by the plurality of neighboring peers that are not stored in the packet buffer.

11. The computer-implemented method of claim 10, further comprising assigning, by the computing device, a timestamp to requests received from the neighboring peers.

12. The computer-implemented method of claim 11, wherein the timestamp includes at least one of a rarity element, an urgency element, and a random element.

13. The computer-implemented method of claim 8, wherein the continuously distributed buffer content advertisements include a probability $N/(N+i)$, where N is a constant that determines a size of a swarming area and i is a distance of a packet from a beginning of the swarming area.

14. The computer-implemented method of claim 8, further comprising requesting, by the computing device, packets of data advertised by the plurality of neighboring peers that are not stored in the packet buffer from at least one of the plurality of neighboring peers.

15. An apparatus comprising:
   at least one processor; and at least one memory configured to store computer readable instructions that, when executed by the at least one processor, cause the apparatus to at least:
  maintain a continuous data flow between the apparatus and a plurality of neighboring peers joined in a network connected to the apparatus at least in part by:
    sending, to a neighboring peer, a buffer map identifying the packets stored in the packet buffer; and
    then distributing, to the neighboring peer, one or more buffer content advertisements identifying incremental updates of content of the packet buffer relative to the sent buffer map, piggybacked to outgoing packets of data from the apparatus to the neighboring peer.

16. The apparatus of claim 15, wherein the at least one memory further stores computer readable instructions that, when executed by the at least one processor, cause the apparatus to:
  determine packets of data advertised by the plurality of neighboring peers that are not stored in the packet buffer;
  communicate requests for packets from the plurality of neighboring peers; and communicate buffer content advertisements to the plurality of neighboring peers.

17. A computer-implemented method comprising maintaining a continuous data flow between a computing device and a plurality of neighboring peers joined in a network connected to the computing device at least in part by:
  receiving, by the computing device from a neighboring peer, a buffer map identifying packets of data stores in a packet buffer of the neighboring peer;
  then receiving, by the computing device from the neighboring peer, one or more buffer content advertisements identifying incremental updates of stored packets of data in its packet buffer relative to the received buffer map, piggybacked to outgoing packets of data from the plurality of neighboring peer.

18. The computer-implemented method of claim 17, further comprising:
  communicating, by the computing device, requests for packets to the plurality of neighboring peers; and
  communicating, by the computing device, buffer content advertisements received from the plurality of neighboring peers.

19. A non-transitory computer-readable medium storing computer executable instructions that, when executed, cause a processor at a computing device to at least:
  maintain a continuous data flow between a computing device and at least one of a plurality of neighboring peers joined in a network connected to the computing device at least in part by:
    sending, to a neighboring peer, a buffer map identifying packets of data stored in a packet buffer of the computing device; and
    then, distributing to the neighboring peer, one or more buffer content advertisements identifying incremental updates of content of the packet buffer relative to the sent buffer map, piggybacked to outgoing packets of data from the computing device to the neighboring peer.

20. The non-transitory computer-readable medium of claim 19, further storing computer executable instructions that, when executed, cause the processor to:
  determine packets of data advertised by the plurality of neighboring peers that are not stored in the packet buffer.

21. The non-transitory computer-readable medium of claim 19, further storing computer executable instructions that, when executed, cause the processor to:
  determine packets of data advertised by the plurality of neighboring peers that are not stored in the packet buffer.

22. The non-transitory computer-readable medium of claim 21, further storing computer executable instructions that, when executed, cause the processor to:
  assign a timestamp to requests received from the neighboring peers.

23. The non-transitory computer-readable medium of claim 22, wherein the timestamp includes at least one of a rarity element, an urgency element, and a random element.

24. The non-transitory computer-readable medium of claim 19, wherein the continuously distributed buffer content advertisements include a probability $N/(N+i)$, where N is a constant that determines a size of a swarming area and I is a distance of a packet from a beginning of the swarming area.

25. The non-transitory computer-readable medium of claim 19, further storing computer executable instructions that, when executed, cause the processor to:
  request packets of data advertised by the plurality of neighboring peers that are not stored in the packet buffer from at least one of the plurality of neighboring peers.

26. The non-transitory computer-readable medium of claim 19, wherein the continuously distributed buffer content advertisements include incremental updates of content of the packet buffer piggybacked to every outgoing packet of data from the computing device.

27. The apparatus of claim 3, wherein the scheduler module further is configured to output packet requests continuously, the packet requests representative of the determined packets of data advertised by the plurality of neighboring peers that are not stored in the packet buffer.

28. A computer-implemented method comprising:
  receiving, by the computing device from each of a plurality of neighboring peers joined in a network, a buffer map identifying packets of data stored in a packet buffer of that neighboring peer;
  receiving, by the computing device, one or more buffer content advertisements from each of the plurality of neighboring peers, buffer content advertisements identifying incremental updates of stored packets of data in a packet buffer associated with that neighboring peer relative to the received buffer map for that neighboring peer;
  in response to receiving each of the buffer content advertisements, feeding each of the buffer content advertisements to a scheduler;
  for each buffer content advertisement received, updating a plan of the scheduler to fetch missing data from at least one of the plurality of neighboring peers;
  continuously picking requests from the scheduler, each request including a request for one packet of missing data; and
  maintaining a continuous data flow between the computing device and the at least one of the plurality of neighboring peers at least in part by continuously sending the requests to the at least one of the plurality of neighboring peers;
  wherein the distributed buffer content advertisements are piggybacked to outgoing packets of data from the neighboring peers.

* * * * *